United States Patent
Soda et al.

[11] Patent Number: 5,917,466
[45] Date of Patent: *Jun. 29, 1999

[54] MATRIX LIQUID CRYSTAL DISPLAY USING LIQUID CRYSTAL HYSTERESIS CHARACTERISTICS FOR STILL PICTURE DISPLAY

[75] Inventors: Norifumi Soda; Masaaki Ozaki, both of Kariya, Japan

[73] Assignee: Nippondenso Co., Ltd., Kariya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/538,213

[22] Filed: Oct. 3, 1995

[30] Foreign Application Priority Data

Oct. 5, 1994 [JP] Japan .................................. 6-240449
Jul. 31, 1995 [JP] Japan .................................. 7-194425

[51] Int. Cl.$^6$ ..................................................... G09G 3/36
[52] U.S. Cl. ........................ 345/100; 345/94; 345/208
[58] Field of Search ............................... 345/94, 95, 96, 345/97, 87, 100, 90, 98, 99, 101, 208–210; 349/33, 34, 100

[56] References Cited

U.S. PATENT DOCUMENTS

| | | | |
|---|---|---|---|
| 4,915,477 | 4/1990 | Ohta et al. ................................... | 345/94 |
| 5,107,354 | 4/1992 | Yamazaki et al. ......................... | 345/96 |
| 5,155,477 | 10/1992 | Shirochi . | |
| 5,367,391 | 11/1994 | Johno et al. ............................... | 345/96 |
| 5,414,443 | 5/1995 | Kantani et al. ............................ | 345/95 |
| 5,606,343 | 2/1997 | Tsuboyama et al. ...................... | 345/97 |
| 5,631,752 | 5/1997 | Tanaka ...................................... | 349/173 |

FOREIGN PATENT DOCUMENTS

| | | |
|---|---|---|
| 362071 | 4/1990 | European Pat. Off. . |
| 530005 | 3/1993 | European Pat. Off. . |
| 559134 | 9/1993 | European Pat. Off. . |
| 5-249435 | 9/1993 | Japan ......................................... 345/94 |

OTHER PUBLICATIONS

T.C.Chieu et al, "High–Resolution and High–Speed Ferro-electric Liquid–Crystal Shutter Array Print Head", IEEE Transacction on Electron Devices 38(1991) Jun., No. 6, pp. 1316–1323.
Patent Abstract of Japan, vol. 17 No. 308 (P-1555) re JP-A 5027718.

*Primary Examiner*—Regina Liang
*Attorney, Agent, or Firm*—Pillsbury Madison & Sutro LLP

[57] ABSTRACT

A matrix liquid crystal display is capable of displaying a still displayed picture by using a hysteresis characteristic of an antiferrodielectric liquid crystal medium or the like. The picture is displayed by applying scan signals from a row driving circuit and data signals from a column driving circuit to a matrix liquid crystal display having an antiferrodielectric liquid crystal medium or the like. When a voltage for stilling the display of the picture is provided to a still signal input terminal, a timing circuit interrupts the application of a clock signal output from a control circuit to the row driving circuit in response to a generated vertical synchronizing signal. When the clock signal is stopped, a holding voltage is applied to each pixel of the liquid crystal display and the displayed picture is put into a still state by the hysteresis characteristic of the antiferrodielectric liquid crystal medium or the like.

19 Claims, 17 Drawing Sheets m: 8~12  n: 6,8 m: 8~12  n: 6,8

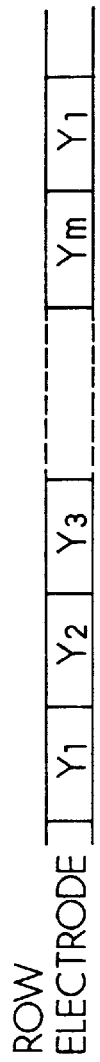
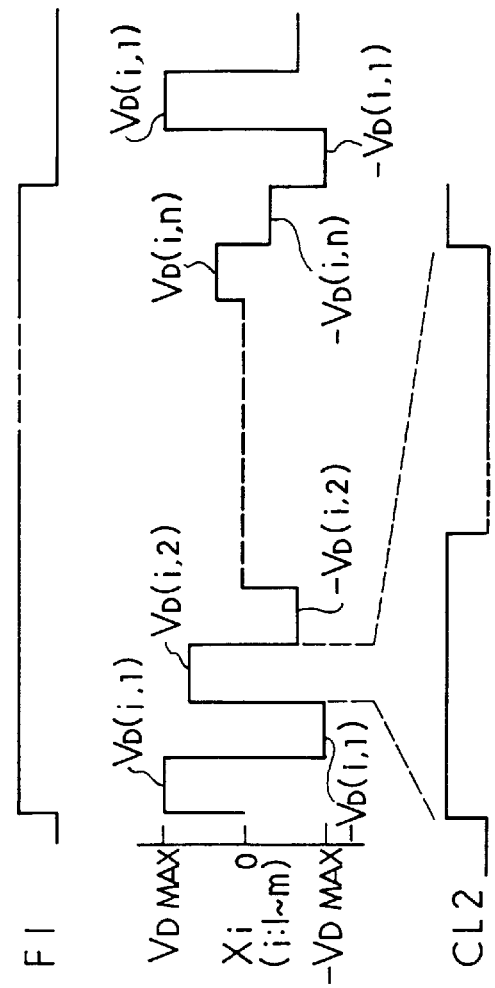
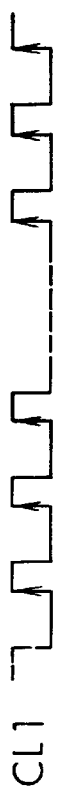
FIG. 6A
FIG. 6B
FIG. 6C
FIG. 6D
FIG. 7A
FIG. 7B
FIG. 7C

VERT. SYNC.

STILL

FLIP-FLOP
OUTPUT

CL3

AND GATE
OUTPUT

FIG. 19A
FIG. 19B
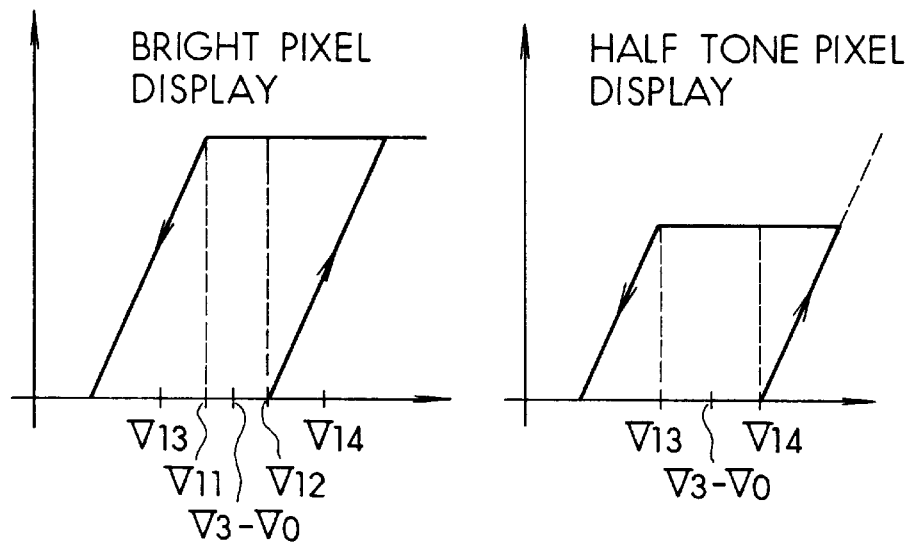
FIG. 20
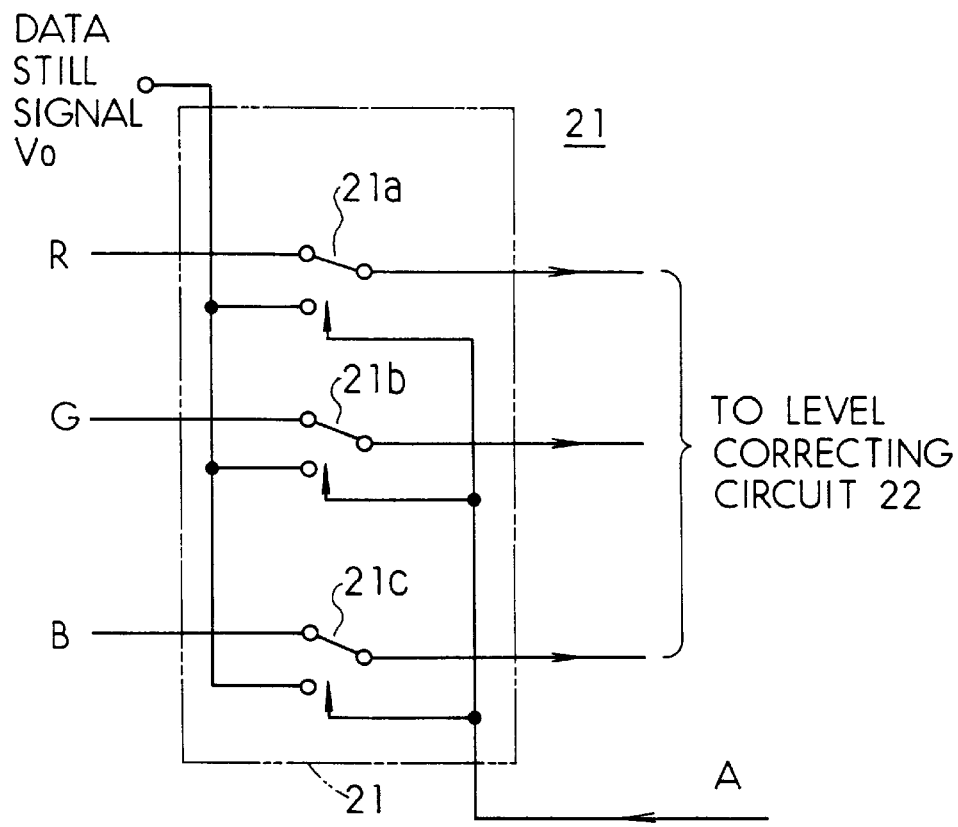

MATRIX LIQUID CRYSTAL DISPLAY USING LIQUID CRYSTAL HYSTERESIS CHARACTERISTICS FOR STILL PICTURE DISPLAY

CROSS-REFERENCE TO RELATED APPLICATIONS

This application is related to and claims priority from Japanese Patent Application Nos. Hei. 6-240449 and Hei. 7-199425, both of which are incorporated herein by reference.

BACKGROUND OF THE INVENTION

1. Field of the Invention

The present invention relates to a matrix liquid crystal display for displaying pictures in a matrix form by using m×n liquid crystal display pixels. More particularly, the invention relates to such devices which are used to display "freeze-frame" or still pictures.

2. Description of Related Art

A matrix liquid crystal display which is mounted in a vehicle as a liquid crystal TV receiver or the like is known in the prior art. However, no picture is displayed on its screen when radio waves normally received by the receiver become weak, e.g., when the vehicle moves far away from the broadcasting station or enters a tunnel, and there has been a demand for a receiver which causes a displayed picture to stand still, i.e., for a receiver which "freezes" or continues the preceding displayed picture to eliminate such reception problems. Further, it is sometimes desirable to cause a displayed picture to stand still when necessary information is displayed on a household TV receiver or the like.

In some prior art systems, the displayed picture is stopped by providing an image memory and by not updating data stored in the image memory when the picture is to be held still. Such prior art systems still have a problem in that the displayed picture cannot be caused to stand still without use of the image memory, thereby increasing the cost and complexity of the system.

A unit in which a displayed picture is held without using the image memory by stopping scan signals and using charges held in a liquid crystal layer has been proposed in Japanese Patent Publication Laid-Open No. Hei. 2-137586. However, when causing a displayed picture to stand still when the radio wave is weak, because the charges held in the liquid crystal layer leak when the scan signal is stopped and the display can be held only for a period of several frames, this approach is inadequate.

SUMMARY OF THE INVENTION

Accordingly, it is an object of the present invention to solve the aforementioned problems by providing a liquid crystal display having adequate picture freezing capabilities. Particularly, it is an object of the present invention to provide such a liquid crystal display which obtains a still picture by utilizing a hysteresis characteristic of an antiferrodielectric liquid crystal medium or the like.

In order to achieve the aforementioned goals, a first aspect of the present invention provides a matrix liquid crystal display using a liquid crystal medium having a hysteresis characteristic in its light transmittance, where a displayed picture is stopped by maintaining each display pixel within the hysteresis area. Accordingly, a stable still picture may be obtained by utilizing the hysteresis characteristic of the liquid crystal medium.

According to this aspect of the invention, a displayed picture can be held after detecting that a display of one field of the displayed picture is finished and after finishing rewriting of the display, so that any incompatibility or mismatch which otherwise occurs in the display of the still picture may be eliminated.

Also, a data signal applied to the liquid crystal display may be fixed at a predetermined voltage when a picture on the display is stilled, so that a variation of light transmittance of the liquid crystal medium caused by the fluctuation of the data signal may be eliminated, thereby providing a stable still picture.

Further, a holding voltage when the displayed picture is stilled may be set to a voltage different from a holding voltage composing the scan signal, so that the variation of the light transmittance in the hysteresis characteristic may be eliminated, thereby also providing a stable still picture.

Moreover, the holding voltage set when the displayed picture is stilled may be adjusted based on the temperature of the liquid crystal display, so that a fluctuation of the display picture which might otherwise be caused by the temperature change when the displayed picture is stilled may be prevented.

The above and other advantages of the present invention will become more apparent in the following description and the accompanying drawings in which like numerals refer to like parts.

BRIEF DESCRIPTION OF THE DRAWINGS

Additional objects and advantages of the present invention will be more readily apparent from the following detailed description of preferred embodiments thereof when taken together with the accompanying drawings in which:

FIGS. 6A–6D are timing diagrams of signals in the column driving circuit;

FIGS. 7A–7C are additional detailed timing diagrams;

FIGS. 19A and 19B are graphs showing hysteresis characteristics in a bright display state and a half tone display state, respectively, of the liquid crystal medium;

FIG. 20 is a schematic diagram showing the structure of the analog switching circuit of FIG. 1;

DETAILED DESCRIPTION OF THE PRESENTLY PREFERRED EXEMPLARY EMBODIMENTS

The preferred embodiments of the present invention are hereinafter described with reference to the accompanying drawings.

Figure 1:
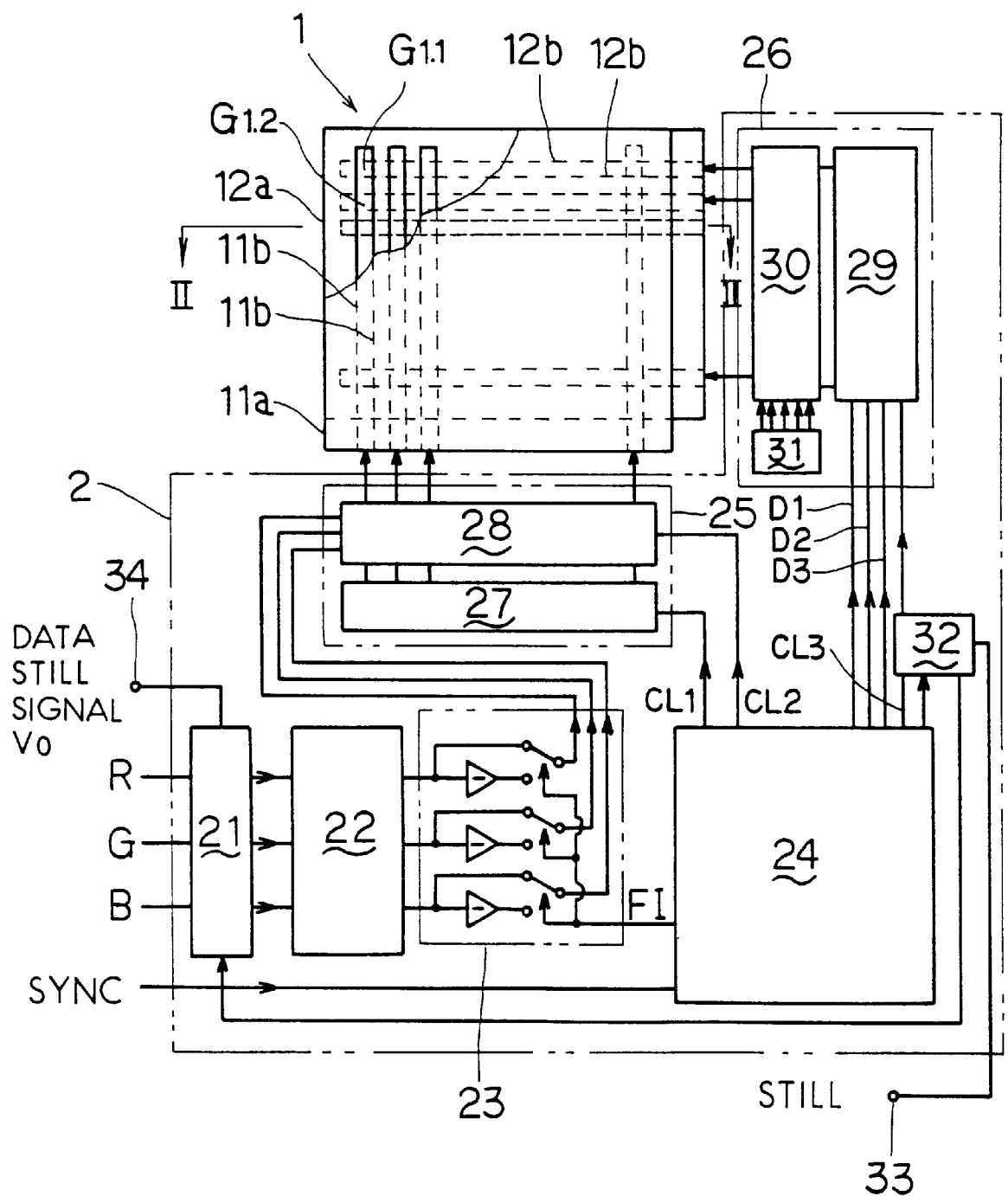
FIG. 1 is a circuit diagram showing the overall structure of a matrix liquid crystal display according to a first embodiment of the present invention.

As shown in FIG. 1, a liquid crystal display according to the a first embodiment of the present invention includes a liquid crystal display 1 containing an antiferrodielectric liquid crystal medium 13 (shown in FIG. 2) and a controller 2 for driving the liquid crystal display 1 by applying voltages to column electrodes $X_1$–$X_m$ and row electrodes $Y_1$–$Y_n$ of the liquid crystal display 1 based on image signals (e.g., RGB color signals) input from an external source to display a picture which corresponds to the image signals on the liquid crystal display 1.

Figure 2:
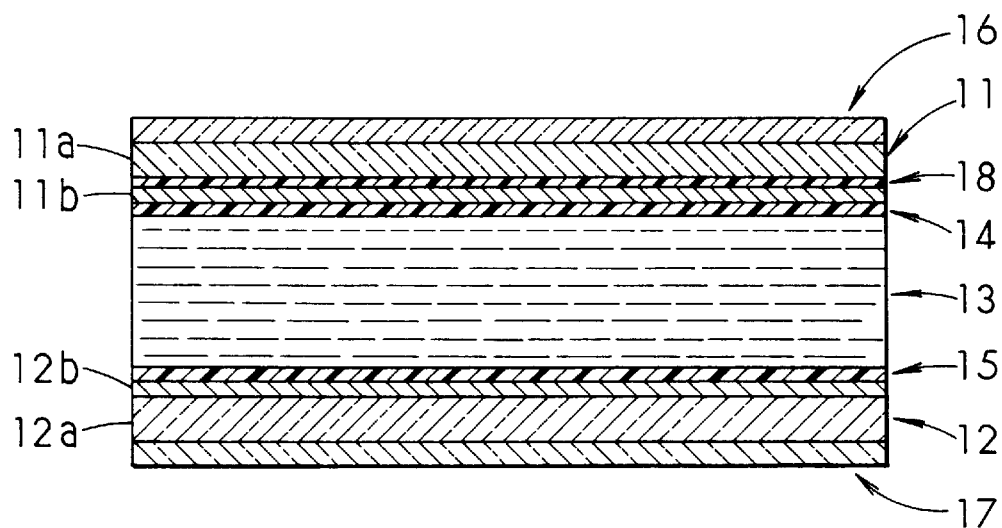
FIG. 2 is a schematic cross-sectional view of a liquid crystal cell used in the first embodiment taken along line II—II of FIG. 1.

The antiferrodielectric liquid crystal medium 13 is contained between two electrode panels 11 and 12 of the liquid crystal display 1 as shown in FIG. 2. The electrode panel 11 is constructed by forming m strips of conductive films 11b composed of ITO (Indium Tin Oxide) or tin oxide, corresponding to a pattern of a color filter 18, along the interior surface of a transparent glass plate 11a with the color filter 18 disposed between the glass plate 11a and the conductive films 11b.

The electrode panel 12 is constructed by forming n strips of conductive films 12b on a transparent glass plate 12a. The m strips of the electrodes $X_1$–$X_m$ of the electrode panel 11 and the n strips of the electrodes $Y_1$–$Y_n$ of the electrode panel 12 are disposed so that they cross at right angles to each other and m×n display pixels $G_{1,1}$, $G_{1,2}$, ... $G_{1,n}$, $G_{2,1}$ ... $G_{m,n}$ are formed on the liquid crystal display 1 as shown in FIG. 1.

Polymer films 14 and 15 are disposed on the interior surface of each of the conductive films 11b and 12b. A rubbing treatment for orienting liquid crystal molecules is implemented on the surface of at least one of the polymer films 14 and 15. It is also possible to provide a non-organic thin film such as an obliquely evaporated film of silicon oxide on the conductive films 11b and 12b instead of the polymer film.

A gap between the electrode panels 11 and 12 filled by the liquid crystal medium 13 is uniformly maintained at, for example, 2 μm by a number of spacers (not shown).

Figure 3A:
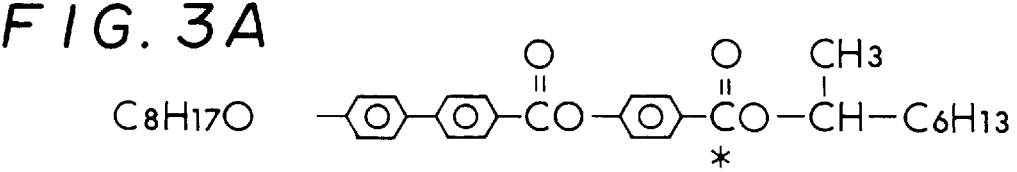
FIGS. 3A–3C show the molecular structure of antiferrodielectric liquid crystals used in the first embodiment.
Figure 3B:
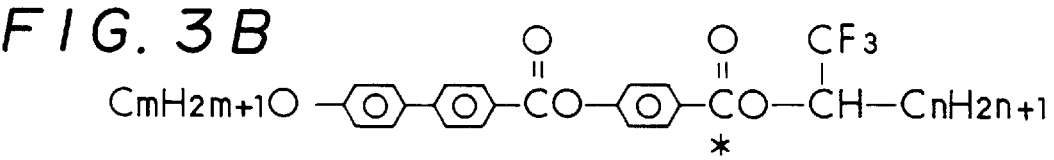
Figure 3C:
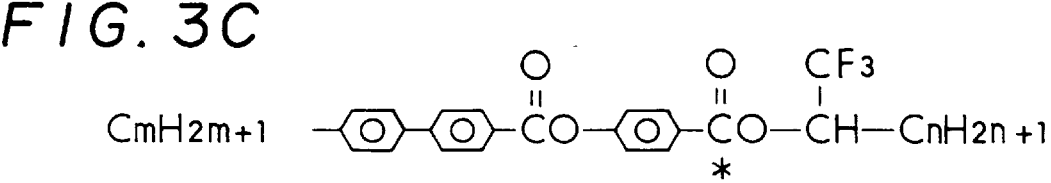

The antiferrodielectric liquid crystal medium 13 is a mixed liquid crystal medium in which a plurality of antiferrodielectric liquid crystals having molecular structures such as those shown in FIGS. 3A–3C are mixed, or is a mixed liquid crystal medium containing at least one type of antiferrodielectric liquid crystal. The antiferrodielectric liquid crystal medium 13 has a first stable state which is stable when no electric field is applied, a second stable state when an electric field is applied in a positive polarity direction and a third stable state when an electric field is applied in a negative polarity direction opposite to the field of the second stable stage. Its light transmittance in each field direction has a hysteresis characteristic.

Figure 4:
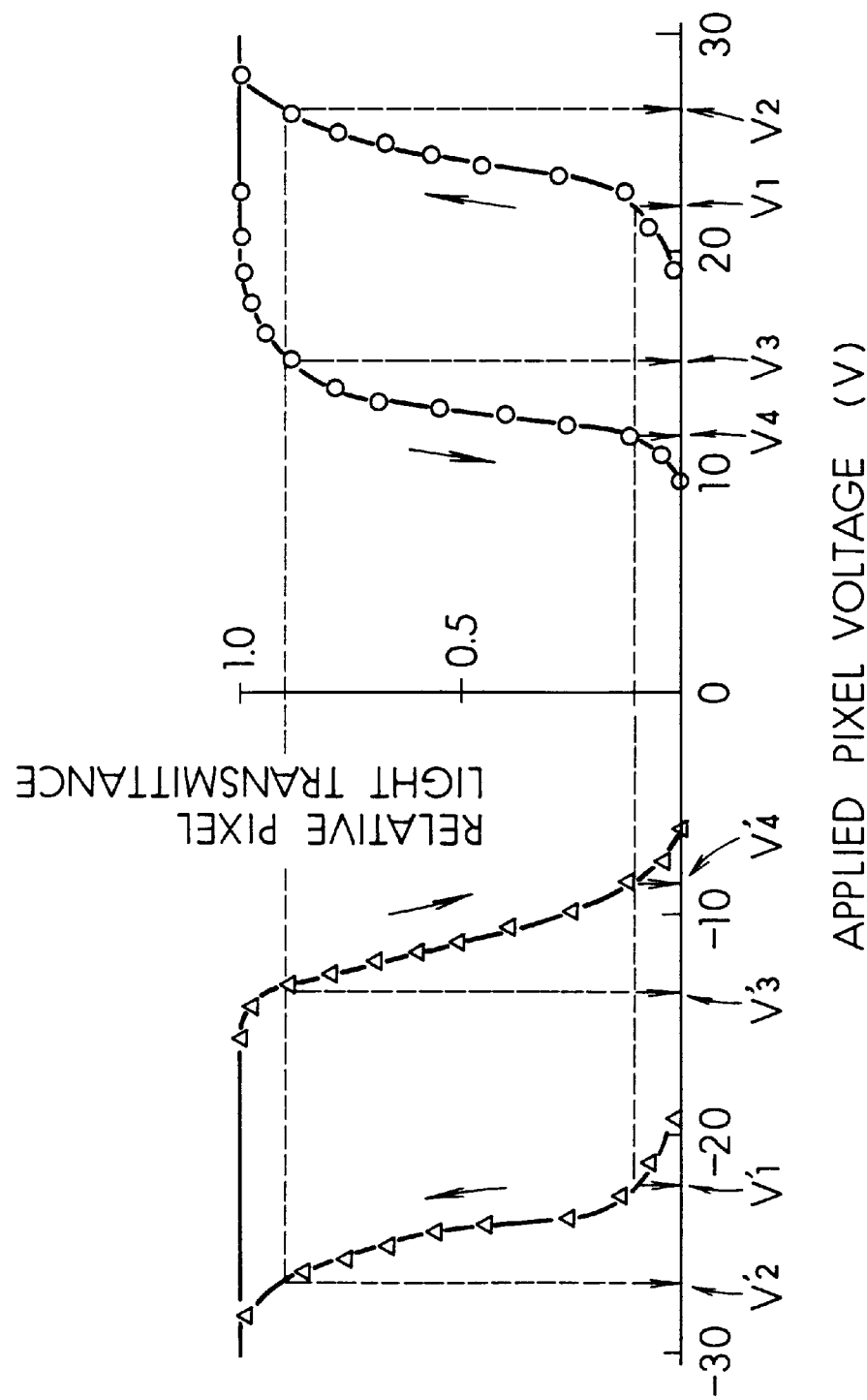
FIG. 4 is a graph showing a hysteresis characteristic of the antiferrodielectric liquid crystals.

FIG. 4 shows the hysteresis characteristics of the liquid crystal medium 13. In FIG. 4, $V_1$ is the voltage required to change the light transmittance of the liquid crystal medium by 10% when it is originally in the first stable state, i.e., when no electric field is applied thereto. $V_2$ is the voltage required to change the light transmittance of the liquid crystal medium by 90% when it is originally in the first stable state. When the liquid crystal medium is in the first stable state and at 90% light transmittance, $V_3$ is the minimum voltage level required to maintain the light transmittance level at 90%, and when the liquid crystal medium is in the first stable state and at 10% light transmittance, $V_4$ is the minimum voltage level required to maintain the light transmittance level at 10%. These voltages $V_1$ through $V_4$ draw a hysteresis loop. Here, a voltage by which the light transmittance changes by 10% from that of one of the extreme states, i.e., 0% transmittance or 100% transmittance, is called a threshold voltage. The above-mentioned voltages $V_1$ and $V_3$ are such voltages. A voltage by which the light transmittance changes by 90% from one of the extreme states is called a saturation voltage. The above-mentioned voltages $V_2$ and $V_4$ are such voltages.

The liquid crystal medium 13 also has a similar hysteresis characteristic when the state is shifted from the first stable state to the third stable state by applying an opposite polarity voltage. In this case, a hysteresis loop is formed by voltages $V_1'$ through $V_4'$.

Polarizing plates 16 and 17 are disposed on the exterior surfaces of the electrode panels 11 and 12 so that their axes of polarization cross at right angles to each other to eliminate light transmission when the liquid crystal 13 is in the first stable state.

Next, a structure of the controller 2 will be explained. The controller 2 uses the circuit shown in FIG. 1 to control a large number of pixels provided on the liquid crystal display 1.

The controller 2 shown in the present embodiment displays images in full color by providing analog RGB signals to the liquid crystal display 1 according to a predetermined format and includes an analog switching circuit 21 for selecting input RGB signals and a constant data still signal $V_0$ applied to terminal 34 used when stopping a displayed picture, a level correcting circuit 22, a signal converting circuit 23, a control circuit 24 for creating various control signals from input synchronization signals, a column driving circuit 25 for applying data signals to column electrodes $X_1$–$X_m$ of the liquid crystal display 1, a row driving circuit 26 for applying scan signals to row electrodes $Y_1$–$Y_n$ of the liquid crystal display 1, and a timing circuit 32 for stopping a displayed picture.

The level correcting circuit 22 converts the input RGB signals into RGB signals which are best suited to the characteristics of the antiferrodielectric liquid crystal medium 13. The signal converting signal 23 is a circuit for selectively passing the RGB signals converted by the level correcting circuit 22 as is or inverting them responsive to a field index signal FI generated by the control circuit 24.

The control circuit 24 outputs three clock signals CL1, CL2 and CL3 and three-bit scan timing signals D1, D2 and D3 which correspond to five voltage levels ($V_E$, $V_S$, $-V_S$, $V_H$ and $-V_H$) composing scan signals, beside the field index signal FI.

The column driving circuit 25 includes a shift register 27 and an analog data latch 28. In detail, the column driving circuit 25 includes a set of shift registers 27 and two stages of sample-and-hold circuits 28a and 28b as shown in FIG. 5.

Figure 5:
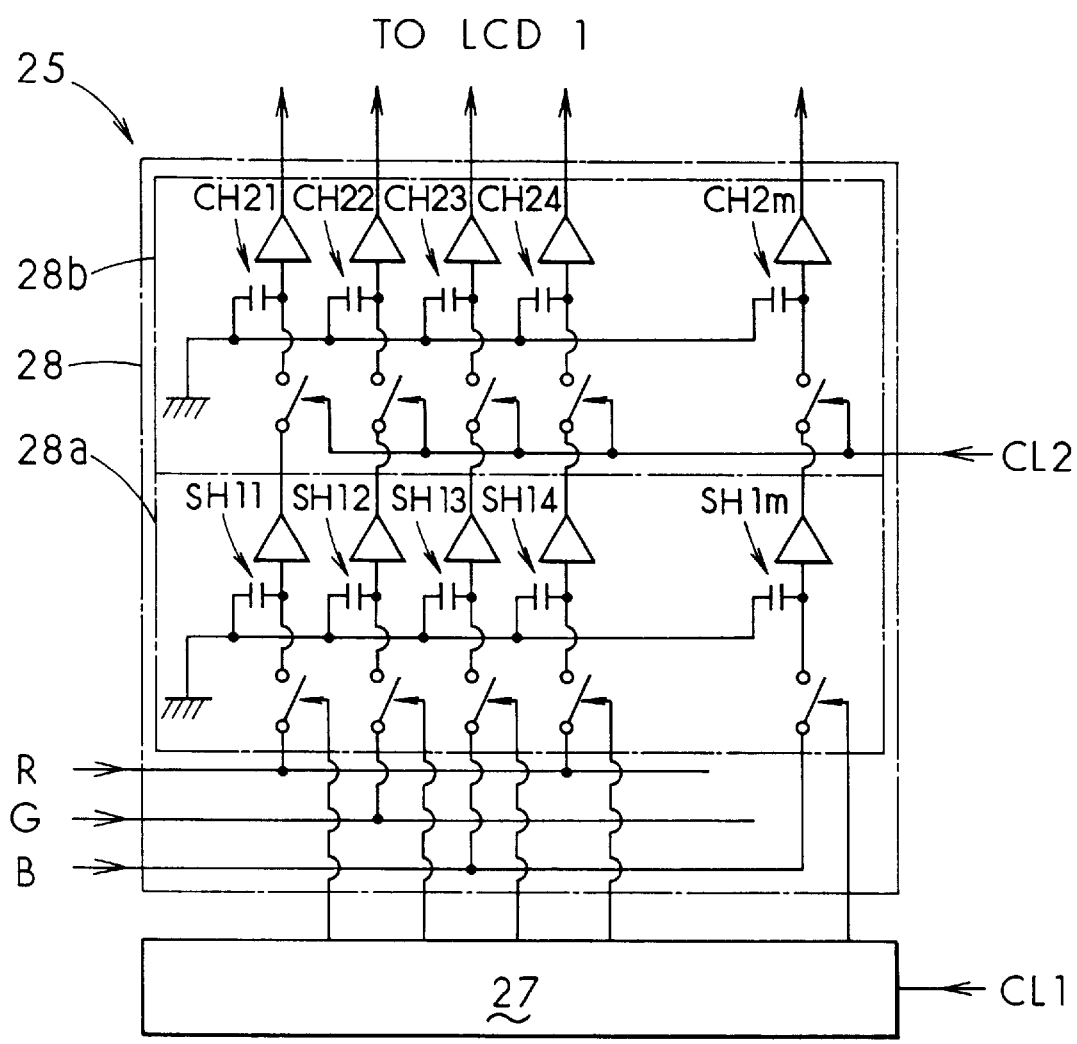
FIG. 5 is a schematic diagram showing the structure of the column driving circuit of FIG. 1.

As shown in FIG. 5, the RGB signals from the signal converting circuit 23 are latched sequentially by initial sample-and-hold circuits SH11, SH12, ... SH1m synchronously with the first clock signal CL1 created by the control circuit 24 and are held after one row of signals have been latched. The signals held by the first sample-and-hold circuit 28a are then latched sequentially by the next sample-and-hold circuits SH21, SH22, SH23, ... SH2m synchronously with the second clock signal CL2 created by the control circuit 24 and are output to each column electrode $X_1$–$X_m$ of liquid crystal display 1 as data signals.

Then, the column driving circuit 25 repeats the above-mentioned actions and outputs a data signal having a driving waveform as shown in FIG. 6D. That is, it outputs RGB data signals $X_1$, $X_2$, ... $X_3$ synchronously with the first clock signal CL1 shown in FIG. 7A. Note that a voltage level of each of the RGB signals is set to be able to display a half tone and as a result, a voltage level of the data signal applied to each column electrode $X_1$–$X_m$ changes according to $V_{D(i,j)}$ as shown in FIG. 6D.

Figure 8:
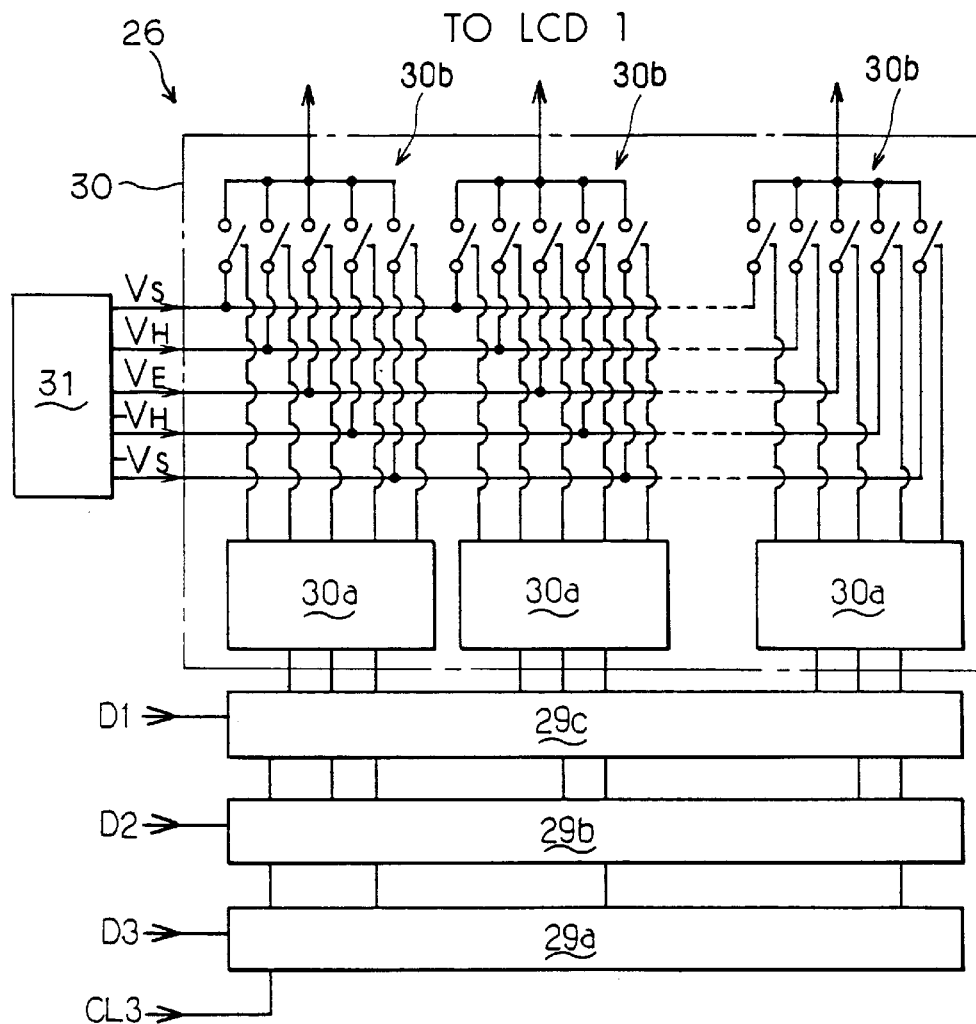
FIG. 8 is a schematic diagram showing the structure of the row driving circuit of FIG. 1.

The row driving circuit 26 comprises a shift register 29, a driver 30 and a voltage level setting circuit 31. In detail, as shown in FIG. 8, the row driving circuit 26 comprises three sets of shift registers 29a, 29b and 29c, a plurality of decoders 30a which correspond to the row electrodes $Y_1$–$Y_n$, a number of switching circuits 30b, each equipped with five analog switches and connected to a corresponding decoder 30a, and a voltage level setting circuit 31 for supplying scan voltage levels ($V_E$, $V_S$, $-V_S$, $V_H$ and $-V_H$) to the analog switching circuits 30b.

The shift registers 29a, 29b and 29c take in the scan timing signals D1, D2 and D3, respectively, synchronously with the third clock signal CL3 created by the control circuit 24. Then, the signals taken in by the shift registers 29a, 29b and 29c are decoded by each decoder 30a to selectively actuate the analog switches of the scan voltage levels ($V_E$, $V_S$, $-V_S$, $V_H$ and $-V_H$) which correspond to decoded data to variously output erase, select and hold scan signals to each row driving electrode $Y_1$–$Y_n$. Note that $V_E$ is an erase voltage for erasing (0 V in the present embodiment), $\pm V_S$ is a selection voltage for selecting a displaying state and $\pm V_H$ is a holding voltage to still a picture.

Figure 9A:
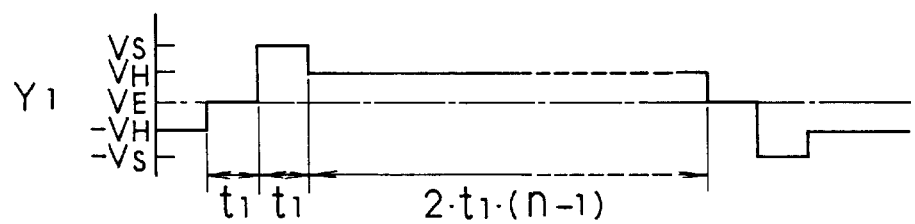
FIGS. 9A–9C are timing diagrams of signals in the row driving circuit.
Figure 9B:
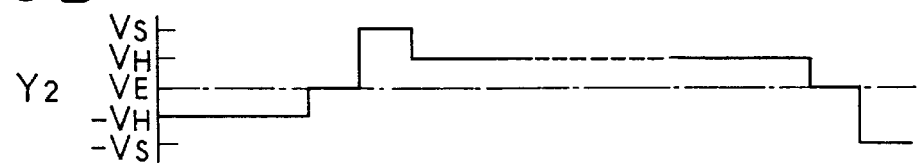
Figure 9C:
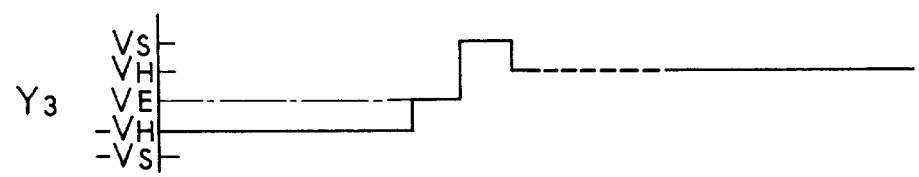
Figure 9D:
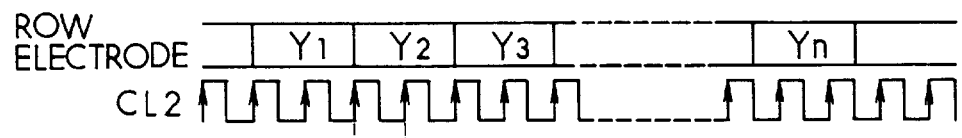
Figure 10A:
FIGS. 10A–10C are additional detailed timing diagrams.
Figure 10B:
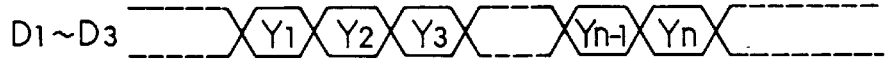
Figure 10C:

Then, the row driving circuit 26 repeats the above-mentioned actions and outputs scan signals having driving waveforms as shown FIGS. 9A–9C. That is, it outputs scan signals $Y_1$, $Y_2$, ... $Y_n$ synchronously with the third clock signal CL3. These scan signals have voltage levels corresponding to a period of either a selection period, holding period or erasing period corresponding to respective rows and have voltage levels corresponding to each period as shown in FIGS. 9A–9D in concrete. The selection periods for selecting a displaying state of a row are generated sequentially in each row with a lag of period $2t_1$.

Next, operations of the above-mentioned liquid crystal display will be explained using, as an example, a case where it takes 16.7 ms to display one screen (corresponding to a 60 Hz screen rewriting frequency) and the number of scan electrodes is 100.

Figure 11:
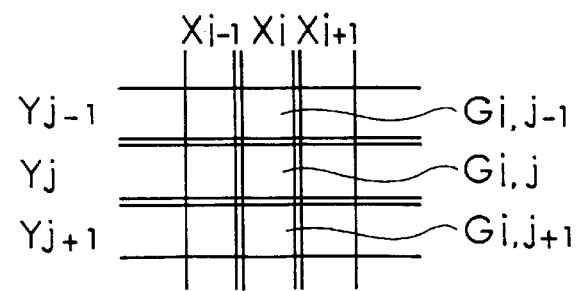
FIG. 11 is a partial enlarged view of row and column electrodes in the matrix liquid crystal display in the first embodiment.
Figure 12A:
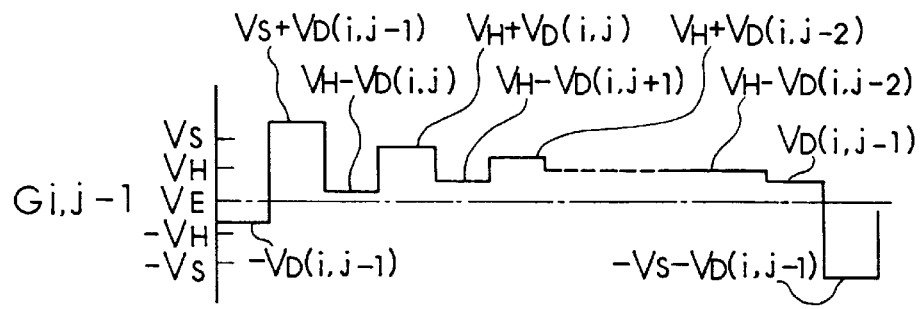
FIGS. 12A–12C are timing diagrams showing waveforms of voltage signals applied between electrodes of the liquid crystal cells in the first embodiment.
Figure 12B:
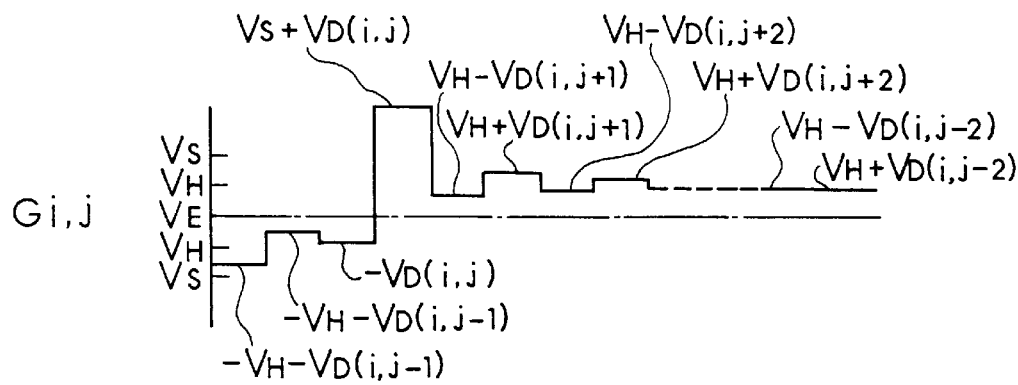
Figure 12C:
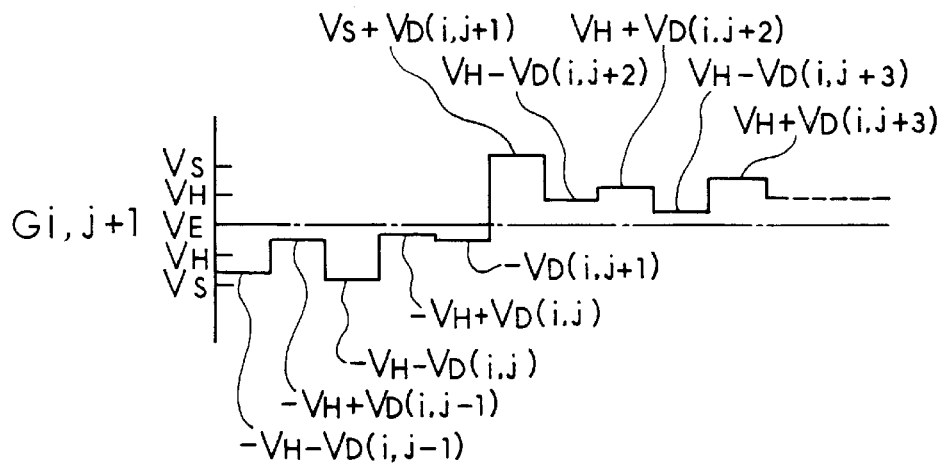

The liquid crystal display of the present embodiment displays in matrix by applying a data signal $V_{D(i,j)}$ as shown in FIG. 6D to each column electrode $X_i$ and applying scan signals as shown in FIGS. 9A–9C to each row electrode $Y_j$. For example, voltages as shown in FIGS. 12A, 12B and 12C are applied to pixels $G_{i,j-1}$, $G_{i,j}$ and $G_{i,j+1}$, respectively, at positions represented as shown in FIG. 11.

At pixel $G_{i,j}$, a data signal $-V_D$ is applied to the column electrode $X_i$ and an erase voltage $V_E$ is applied to the row electrode $Y_j$ during the erasing period. Then, the antiferrodielectric liquid crystal of the pixel $G_{i,j}$ is put into the first stable state. In the ensuing selection period, $V_S+V_{D(i,j)}$ is applied to the pixel $G_{i,j}$, setting its light transmittance corresponding to that voltage. In the succeeding holding period, a voltage in which $V_3$ and a data signal $V_{D(i,k)}$ (k=1, 2, 3, ... n, k≠j) of another pixel on the same column electrode $X_i$ are combined is applied to the pixel $G_{i,j}$. The erase pulse width and selection pulse width are 83.3 μs and the holding period is 16.5334 ms.

Figure 13:
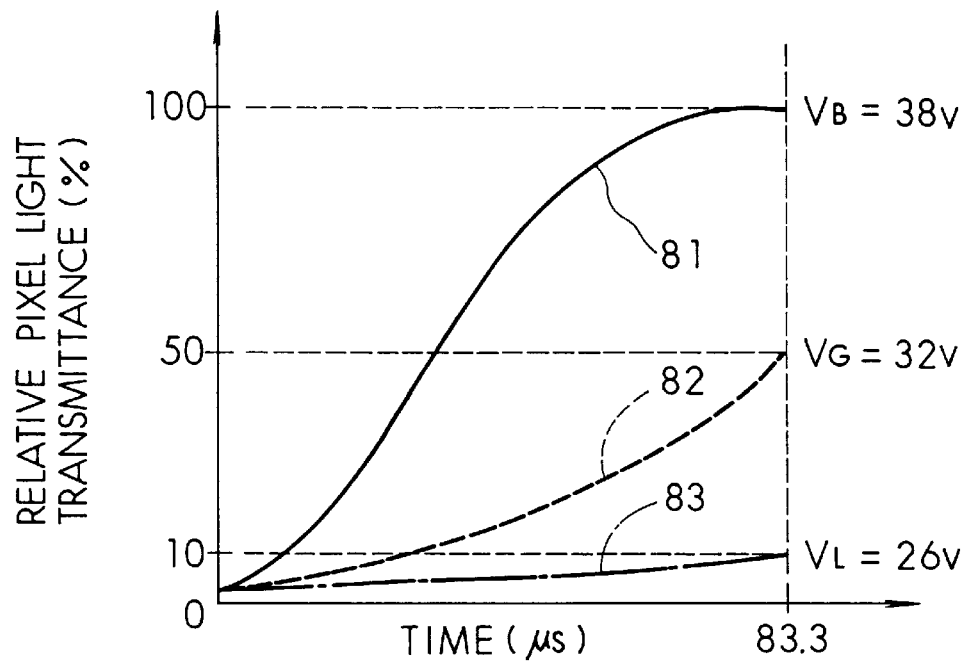
FIG. 13 is a graph showing the relationship between voltages applied to the liquid crystal display during a selection period and intensity of light transmitted therethrough.

FIG. 13 shows timewise variations of intensity of transmitted light during the selection period. Curve 81 represents a case when a pixel is set to display brightly, i.e., high light transmittance, and a voltage $V_B$=38 V is applied to the pixel $G_{i,j}$. Curve 82 represents a case of half tone, i.e., medium transmittance, where a voltage $V_G$=32 V is applied to the pixel $G_{i,j}$. Curve 83 represents a case when the pixel is set to display darkly, i.e., low transmittance, and a voltage $V_L$=26 V is applied to the pixel $G_{i,j}$.

Figure 14:
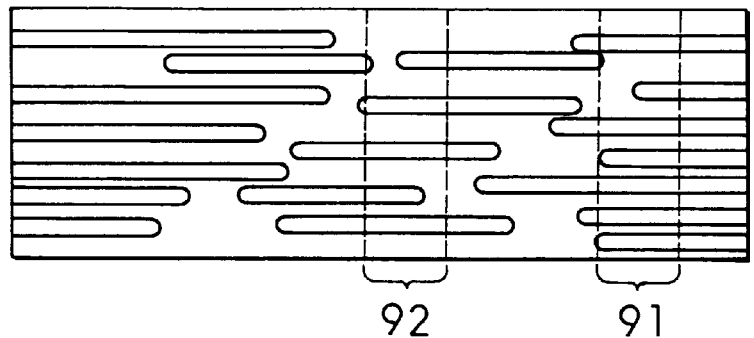
FIG. 14 is a diagrammatic view showing a displayed state of the antiferrodielectric liquid crystal medium in displaying an intermediate color.

When a voltage more than $V_L$ and less than $V_B$, i.e., a voltage $V_G$, is applied to the pixel $G_{i,j}$, the antiferrodielectric liquid crystal is put into a state wherein first stable states 91 and stripe inversion areas 92 are mixed as shown in FIG. 14. Because a large number of the stripe inversion areas 92 are generated within the pixel, the pixel is recognized visually as a half tone pixel. The greater the value of $V_G$, the larger the area of the stripe inversion areas 92 becomes. Accordingly, a half tone may be displayed arbitrarily using the voltage $V_G$ applied during the selection period.

Figure 15:
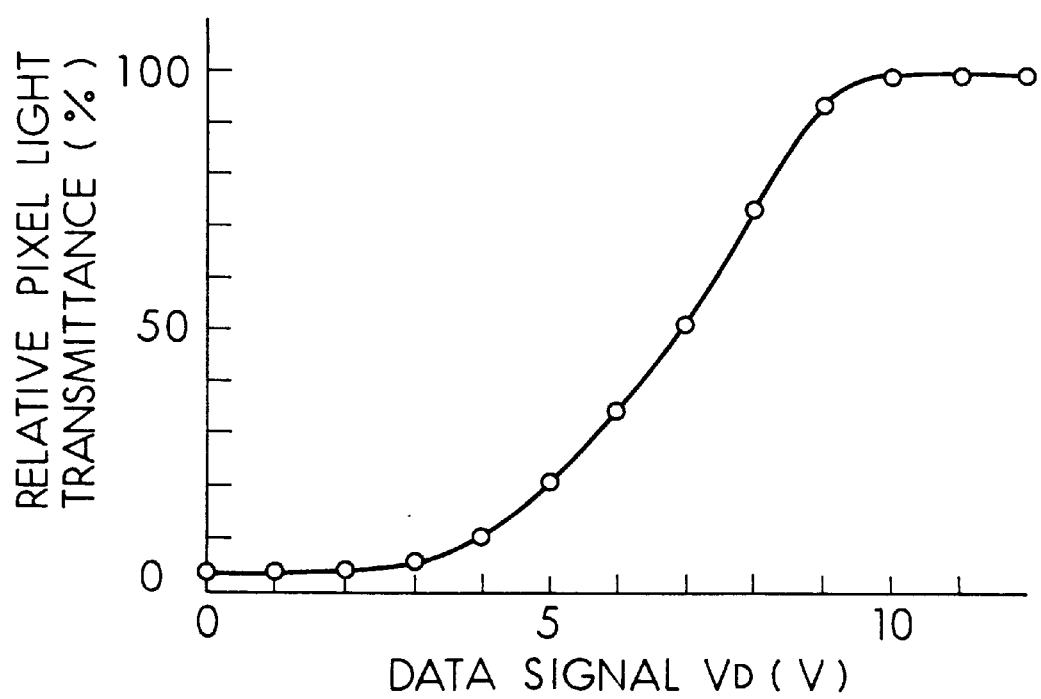
FIG. 15 is a graph showing a relationship between data signals applied to the liquid crystal display and average intensity of light transmitted therethrough.

FIG. 15 is a graph of a measured average intensity of transmitted light of one pixel per time of one screen when $V_E$=0 V, $V_S$=28 V and $V_H$=9 V and when $V_D$ is changed. It can be seen from FIG. 15 that bright, dark and half tones may be displayed when $V_D$ is changed between 0 V and 10 V.

Figure 16:
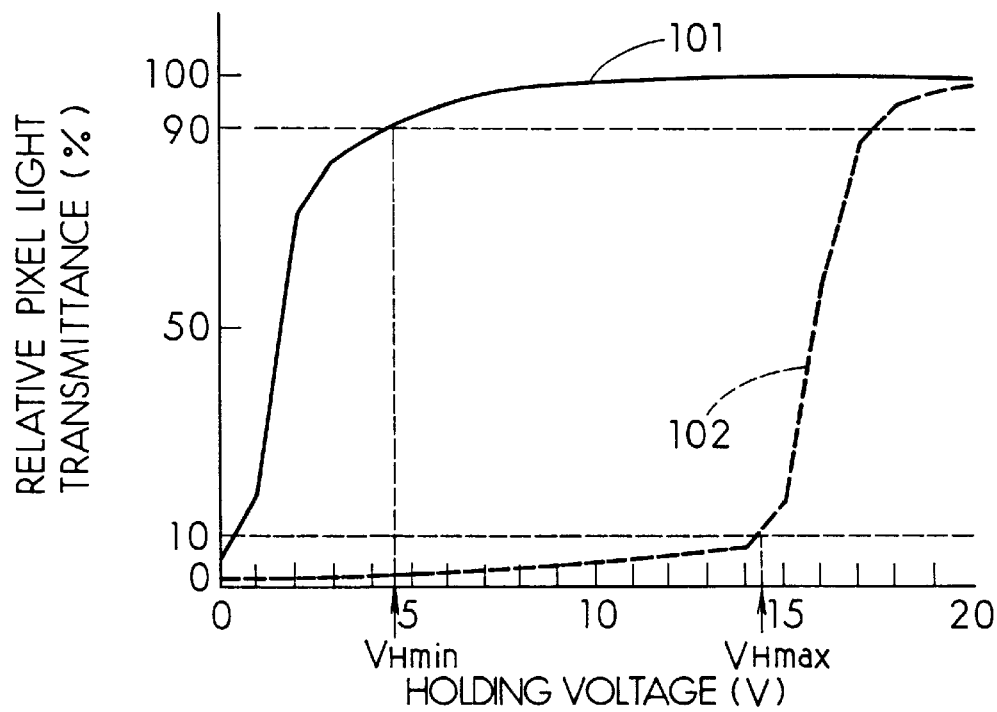
FIGS. 16 is a graph showing how to set a holding voltage V3 according to the hysteresis characteristic of the antiferrodielectric liquid crystal medium.

Next, an operation of the invention during the holding period will be explained. Average values of intensity of transmitted light of the pixel $G_{i,j}$ change relative to the holding voltage $V_H$ during the holding period as shown in FIG. 16. The curve 101 represents a case when the pixel is set to display brightly when $V_B$ is applied during the selection period, and curve 102 represents a case when the pixel is set to display darkly when $V_L$ is applied during the selection period. Because the curve 101 represents the case where the pixel is set to display brightly, the average intensity of transmitted light during the holding period is more than 90% of the saturation value. Accordingly, it is necessary to set $V_H$ above a minimum value $V_{Hmin}$. Further, because the curve 102 represents the case when the pixel is set to display darkly, the average intensity of transmitted light during the holding period is less than 10%. Accordingly, it is necessary to set $V_H$ below a maximum value $V_{Hmax}$.

A maximum voltage applied during the holding period is $V_H+V_{Dmax}$. Because a time during which $V_H+V_{Dmax}$ is applied is equal to the selection period, the antiferrodielectric liquid crystal responds when this voltage becomes greater than $V_L$, deviating from a state to be displayed. Accordingly, $V_H+V_{Dmax}$ is set to be smaller than $V_L$.

While the operation in the case of the positive polarity has been described above, it also applies to the case of the negative polarity.

From the above description, according to the present embodiment, the holding voltage $V_H$ is set at a value in the middle of voltages $V_1$ and $V_3$ in the hysteresis characteristic shown in FIG. 4, i.e., at $V_H=(V_1+V_3)/2$. Because the data signal $V_{Dmax}$ must satisfy the inequality $V_H+V_{Dmax} \leq V_1$ and $(V_H-V_{Dmax}) \geq V_3$, $V_{Dmax}$ is set so that $V_{Dmax}<(V_1-V_3)/2$. By setting the voltages as described above, a display picture can be prevented from fluctuating during the holding period because a stable state may be maintained using the hysteresis characteristic.

In the hysteresis characteristic shown in FIG. 4, $V_1-V_3>V_2-V_1$. Because a range in which an amplitude of the data signal changes is defined by $V_2-V_1$, a range for setting the holding voltage $V_H$ may be increased by using a hysteresis characteristic having $V_1-V_3$ greater than $V_2-V_1$. That is, the holding voltage may be readily set.

The first embodiment of the matrix liquid crystal described above is characterized in that the timing circuit 32 and the analog switching circuit 21 are provided to display a still picture.

Figure 17:
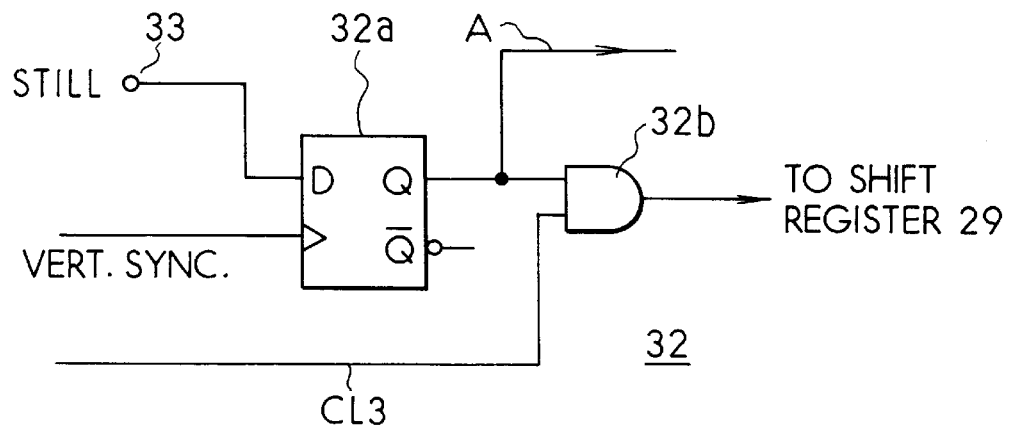
FIG. 17 is a schematic diagram showing the structure of the timing circuit 32 of FIG. 1.
Figure 18A:
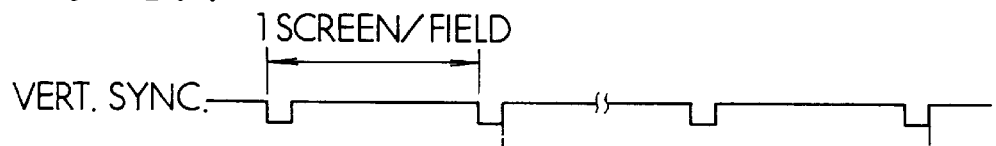
FIGS. 18A–18E are timing diagrams showing waveforms of signals at various points in FIG. 17.
Figure 18B:
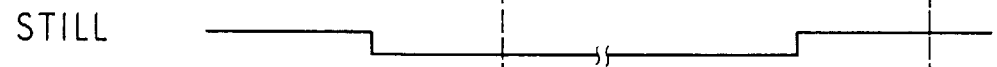
Figure 18C:
Figure 18D:
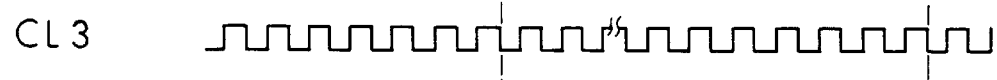
Figure 18E:
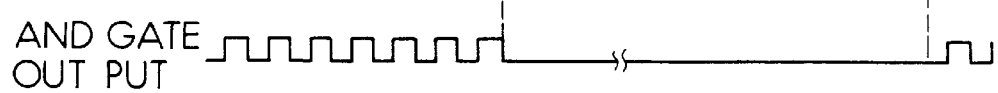
Figure 18E:
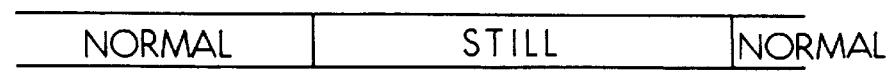

FIG. 17 shows a detailed structure of the timing circuit 32. The timing circuit 32 includes a D type flip-flop 32a to which a still signal from a still terminal 33 is input through a D input terminal and a vertical synchronizing signal is input through a clock terminal, and an AND gate 32b for generating a logical AND between an output Q of the flip-flop 32a and the third clock signal CL3.

The vertical synchronizing signal is generated from the synchronizing signal input to the control circuit 24 and gives a starting timing of one screen (one field) as shown in FIGS. 18A–18E. A high-level signal is provided to the still terminal 33 during normal display when a still picture is not displayed and a low-level signal is input when a still picture is displayed.

For generating the still signal to display a still picture, a field strength detector which monitors a field strength of the broadcasting wave, generates a hold signal when it drops less than a preset value and releases the generation of the hold signal when the field strength returns above the preset value may be used from a tuner of a TV receiver, for example.

An operation of the timing circuit 32 constructed as described above will be explained with reference to the timing charts shown in FIGS. 18A–18E.

Because the Q terminal output of the flip-flop 32a is maintained at high-level during normal display when the still signal is at a high level, the AND gate 32b outputs the third clock signal CL3 as it is. Thus, a picture is displayed as described above.

In contrast, when a low-level signal is provided to the still terminal 33, the Q terminal output of the flip-flop 32a falls to a low level when the vertical synchronizing signal changes from low level to high level, i.e., when the next field is started, so that an output of the AND gate 32b falls to a low level. Accordingly, because the third clock signal CL3 is not output, no scan signal is output from the row driving circuit 26.

The holding voltage $V_H$ is applied to each row electrode $Y_1-Y_n$ at this starting time of the field. Accordingly, each pixel maintains a display state up to then using the hysteresis characteristic shown in FIG. 4 of the antiferrodielectric liquid crystal medium 13 described above. That is, the displayed picture may be caused to stand still. Because the display is held here utilizing the hysteresis characteristic of the antiferrodielectric liquid crystal medium 13, not utilizing the capacitance characteristic of a liquid crystal medium like the prior art, stilling of the display may be maintained while the holding voltage is applied.

Note that when the signal at the still terminal 33 changes in the middle of the field and a picture is caused to stand still at that moment, a mismatch incompatibility occurs in the display since it is in the middle of writing a full screen of the display. For this reason, the flip-flop 32a is provided as described above so that the display is not held until the writing of the field is finished (even if the signal level of the still terminal 33 changes in the middle of the field) and to still the display at the starting point of the next field, i.e., at a timing when the vertical synchronizing signal is generated. Accordingly, a still picture having no mismatch in the display may be created.

FIGS. 19A and 19B show hysteresis characteristics when the pixel is in a bright display state and when the pixel is in a half tone display state, respectively. Threshold voltages during the holding period ($V_{11}$, $V_{12}$ in FIG. 19A and $V_{13}$, $V_{14}$ in FIG. 19B) change in response to the display state. Because a voltage applied to each pixel during the holding period becomes a voltage to which a data signal $V_D$ of another pixel is added as described before, it is not constant. Then, there is a possibility that a picture is not displayed stably as the voltage applied to each pixel varies and the light transmittance of the liquid crystal varies, deviating from the upper stable state of the hysteresis characteristic of the liquid crystal due to the variation of the voltage.

The analog switching circuit 21 is provided in the present embodiment to eliminate such a problem. FIG. 20 shows a detailed structure of the analog switching circuit 21.

RGB signals and a data still signal $V_0$ are selected through analog switches 21a, 21b and 21c by a Q terminal output signal A from flip-flop 32a. of the timing circuit 32. During normal display when the Q terminal output signal A of the flip-flop 32a is at a high level, the RGB signals are selected and output. When a still picture is displayed and the Q terminal output signal A of the flip-flop 32a falls to a low level, the data still signal $V_0$ is selected and output.

The data still signal $V_0$ is set so that a voltage $V_H-V_0$ applied to each pixel is maintained at the upper stable state of the hysteresis characteristic regardless of a display state of each pixel. Accordingly, the fluctuation of the display described above may be prevented because no data signal which varies according to the RGB signals is applied and the constant holding potential $V_0$ is applied when the still picture is displayed.

Figure 21A:
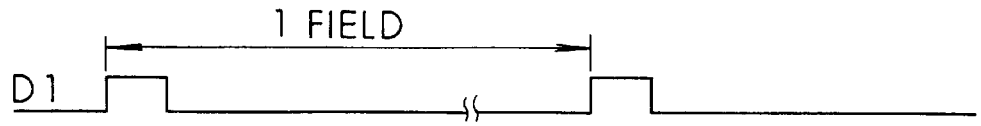
FIG. 21A–21C are graphs showing waveforms of scan timing signals.
Figure 21B:
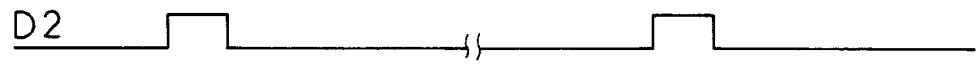
Figure 21C:
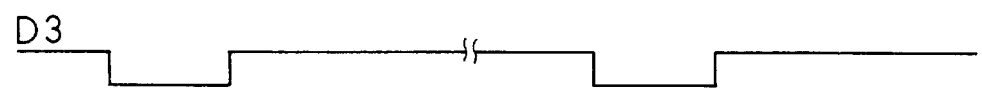
Figure 22:
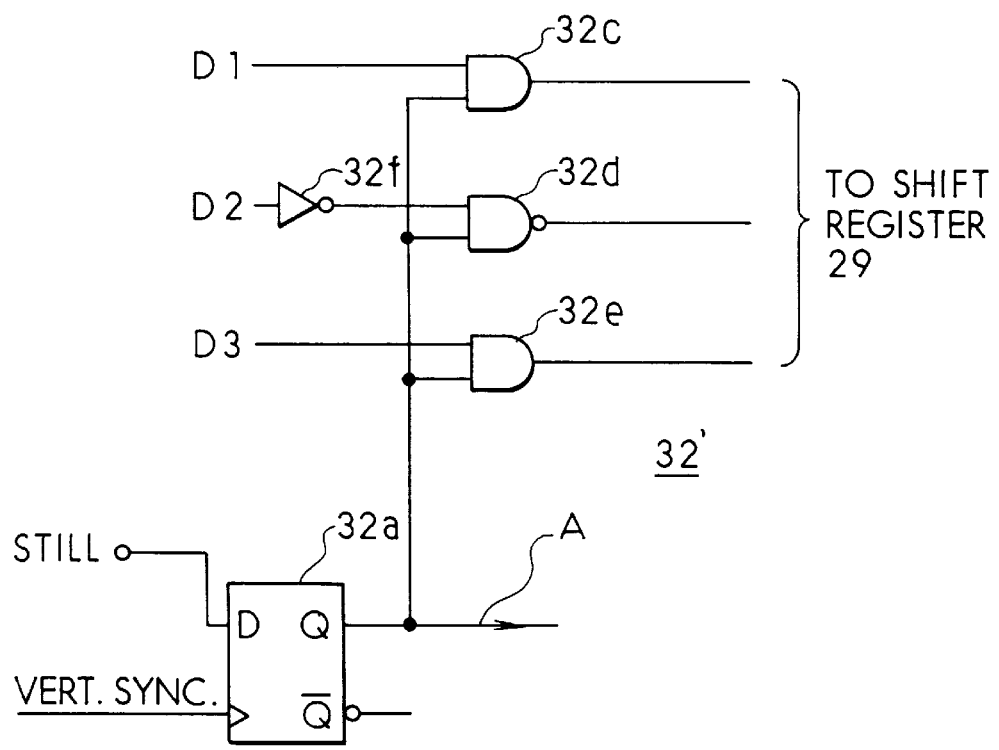
FIG. 22 is a schematic diagram showing the structure of a timing circuit according to a second embodiment of the present invention.

While a system which stops the application of the third clock signal CL3 to the row driving circuit 26 to cause a displayed picture to stand still has been presented in the first embodiment, the scan timing signals $D_1$ and $D_3$ input to the shift registers 29a and 29c are maintained at a low level and the scan timing signal $D_2$ input to the shift register 29b is maintained at a high level to limit the voltage applied to each row electrode $Y_1$-$Y_n$ from the row driving circuit 26 only to the holding voltage according to a second embodiment. Note that the scan timing signals $D_1$, $D_2$ and $D_3$ are represented as shown in the timing charts of FIGS. 21A–21C and give timings for generating each voltage waveform in the periods of the erase, selection and holding in FIGS. 9A–9C.

Figure 23:
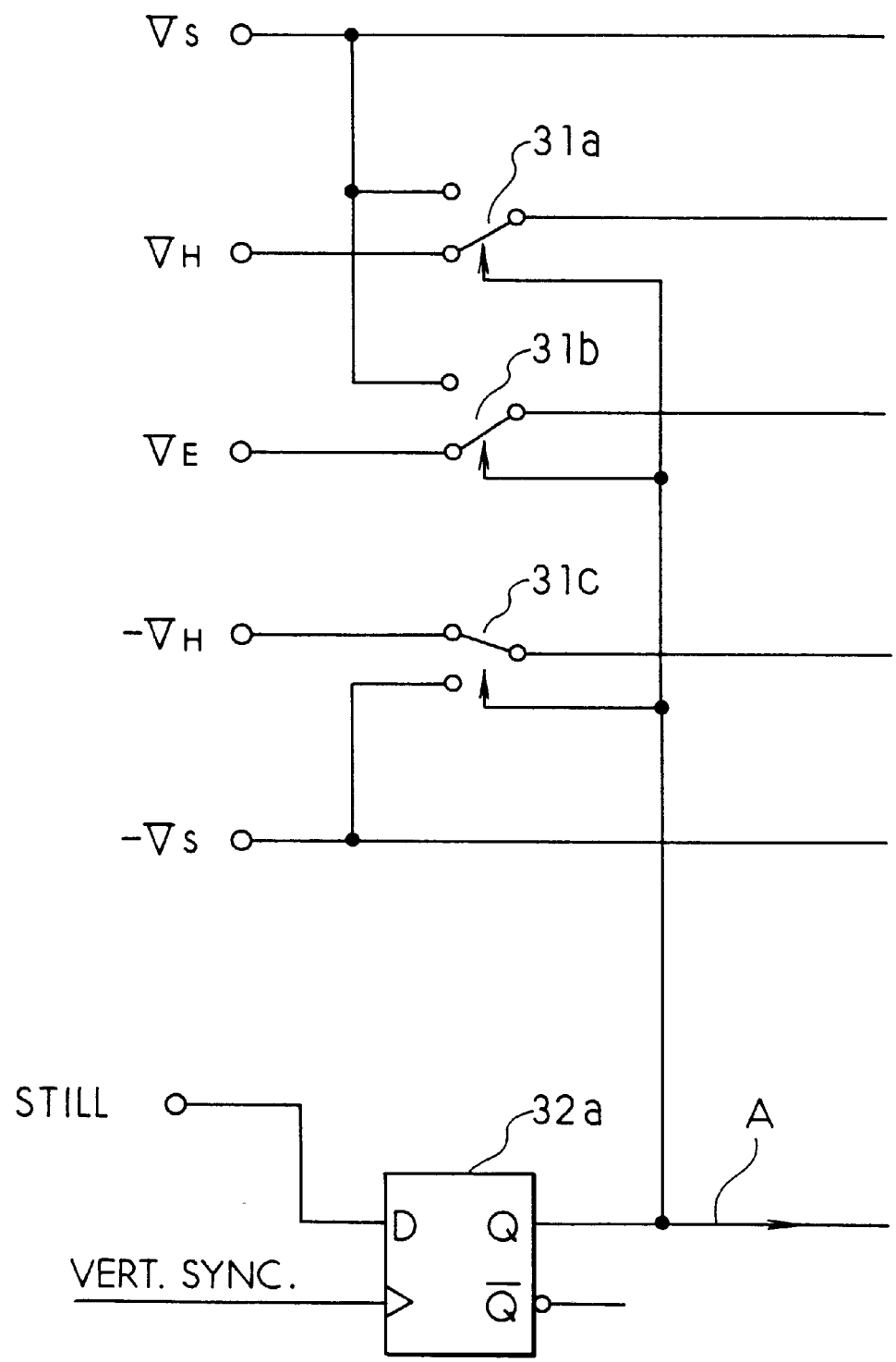
FIG. 23 is a schematic diagram showing the structure of a voltage level setting circuit according to a third embodiment of the present invention.

In the second embodiment, a timing circuit 32' similar to the one in FIG. 1 is provided for scan timing signals $D_1$, $D_2$ and $D_3$ lines, but not for the third clock signal CL3 line. FIG. 23 shows the structure of the timing circuit 32' of the second embodiment.

The structure of the timing circuit 32' up to the flip-flop 32a is the same as in the first embodiment. The timing circuit 32' of the second embodiment is arranged so that outputs of AND gates 32c and 32e go to a low level and an output of a NAND gate 32d goes to a high level responsive to a low level output of the flip-flop 32a when a picture is caused to stand still.

Accordingly, low, high and low signals are provided to the shift registers 29a, 29b and 29c and as a result of the decoding collectively implemented by the shift registers 29a, 29b and 29c and the decoders 30a, only the holding voltage is output from the row driving circuit 26. Accordingly, a displayed picture is caused to stand still in a manner similar to the first embodiment.

Note that a NOT gate 32f is provided so that the scan timing signal $D_2$ during the normal operation has the same waveform as the original one.

According to a third embodiment of the present invention, a scan voltage level created by the voltage level setting circuit 31 is changed without changing the signal passing from the control circuit 24 to the shift register 29. That is, the whole scan voltage level goes to the holding voltage when a picture is caused to stand still. FIG. 23 shows the structure of the voltage level setting circuit 31 in the third embodiment.

Its structure up to the flip-flop 32a is the same with that of the first embodiment. According to the present embodiment, analog switches 31a and 31b are switched to select the voltage level $V_H$ and an analog switch 31c is switched to select the voltage level $-V_H$ when the output of the flip-flop 32a is at a low level when a picture is caused to stand still. Accordingly, voltages during the selection period, holding period and erasing period all go to the holding voltage. Accordingly, a displayed picture is caused to stand still in a manner similar to the first and second embodiments.

The characteristic of voltage and intensity of light transmittance varies depending on temperature. For this reason, in a fourth embodiment the voltage levels of the selection voltage $V_S$ and holding voltage $V_H$ are corrected in response to a temperature of the liquid crystal display 1 to be able to select and hold a display adequately regardless of temperature changes. Accordingly, a display may be adequately held even when the displayed picture is caused to stand still.

Figure 24:
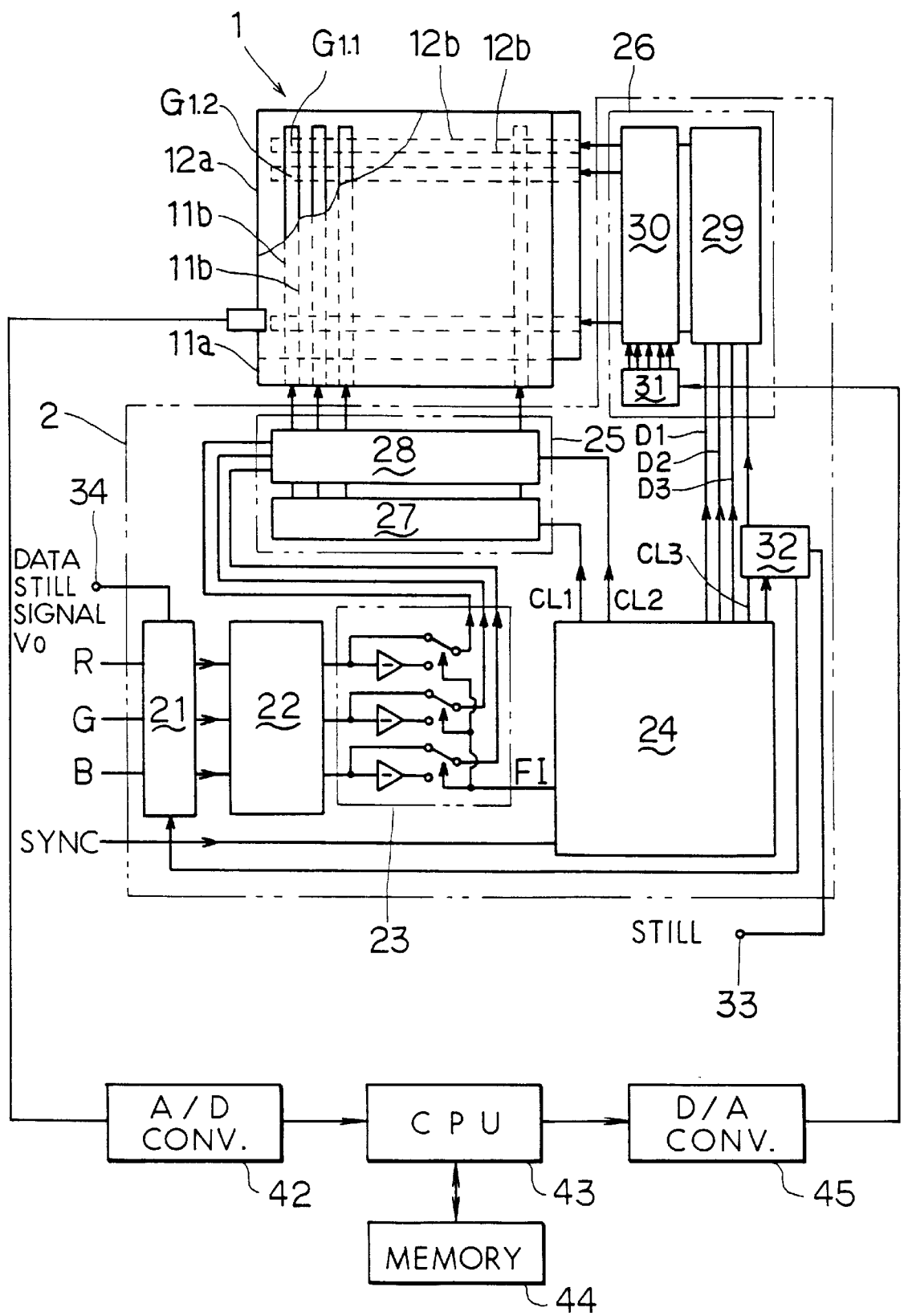
FIG. 24 is a schematic diagram showing the overall structure of a matrix liquid crystal display according to a fourth embodiment of the present invention.

According to the fourth embodiment, a temperature sensor 41 for detecting a temperature of the liquid crystal display 1 is provided as shown in FIG. 24. A CPU 43 receives a signal from the temperature sensor 41 via an A/D converter 42 to perform a temperature correcting process.

Figure 25:
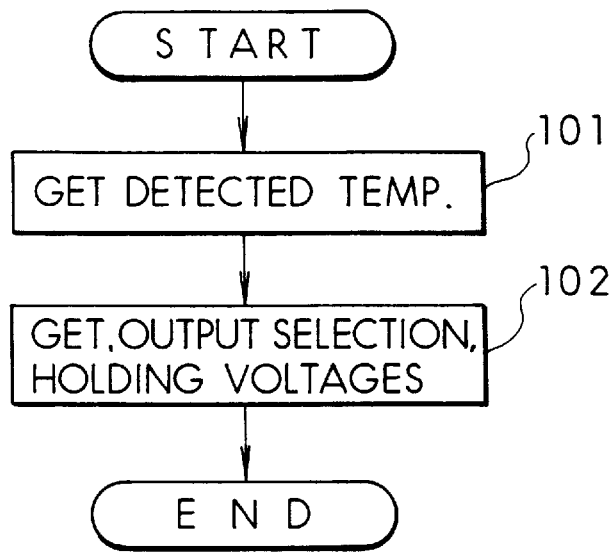
FIG. 25 is a flowchart showing a temperature correcting process of the CPU of FIG. 24.

FIG. 25 shows a flowchart of the temperature correcting process performed by the CPU 43. The CPU 43 takes in the detected temperature from the temperature sensor 41 via the A/D converter 42 in Step 101 and then retrieves and outputs selection and holding voltages $V_S$ and $V_H$ from a map stored in a memory 44 based on the detected temperature in Step 102.

Figure 26:
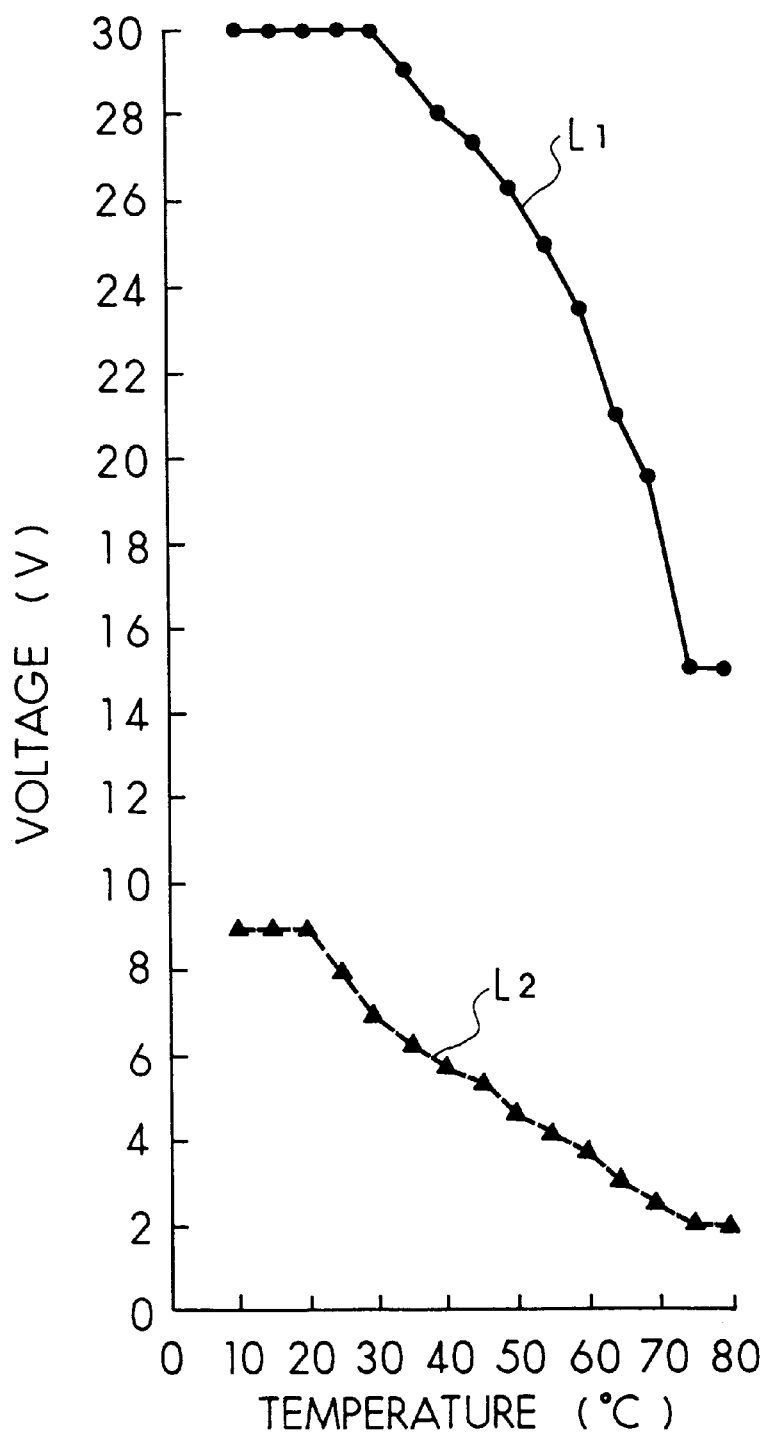
FIG. 26 is a graph showing temperature-voltage characteristics according to a map stored in the memory of FIG. 24.

That is, a map which conforms to a temperature-voltage characteristic shown in FIG. 26 is stored in the memory 44. The selection voltage is retrieved from a map which conforms to the characteristic curve L1 and the holding voltage is retrieved from a map which conforms to the characteristic curve L2. Respective retrieval results are output to the voltage level setting circuit 31 via a D/A converter 45. The voltage level setting circuit 31 sets the selection voltage $V_H$ and the holding voltage $V_S$ based on the outputs.

The fourth embodiment described above may be implemented in conjunction with any of the first through third embodiments described above and allows the system to select and hold a display adequately regardless of a temperature change.

While the analog switching circuit 21 has been provided to prevent the display from varying due to the fluctuation of the level of data signals when the hold voltage is applied in the first through fourth embodiments described above, according to a fifth embodiment of the present invention, the holding voltage itself is changed to be able to stabilize a display even when the level of the data signal fluctuates.

Figure 27:
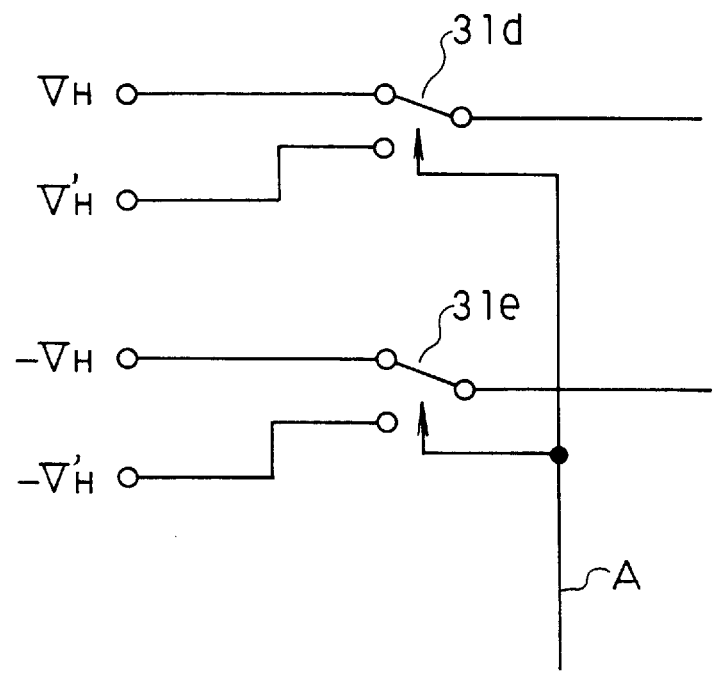
FIG. 27 is a schematic diagram showing part of the structure of a voltage level setting circuit according to a fifth embodiment of the present invention.

That is, as shown in FIG. 27, analog switches 31d and 31e which switch the holding voltages $V_H$ and $-V_H$ to $V_H'$ and $-V_H'$ responsive to the Q terminal output signal A of the flip-flop 32a are provided. Then, when the Q terminal output signal A of the flip-flop 32a goes to a low level when a picture is caused to stand still, the holding voltages $V_H'$ and $-V_H'$ are selected and are applied to each row electrode $Y_1$-$Y_n$. The holding voltages $V_H'$ and $-V_H'$ here are set so that they are maintained at the upper stable state of the hysteresis characteristic even when the data signal fluctuates for the hysteresis characteristic of each display state, i.e., so that the display state of the still picture is optimized.

The temperature correction of the holding voltages $V_H'$ and $-V_H'$ may be performed also in the present embodiment in a manner similar to that of the fourth embodiment described above.

Note that although the present invention has been implemented with a liquid crystal display using an antiferrodielectric liquid crystal medium in the embodiments described above, it may be implemented with a display using a liquid crystal medium having such hysteresis characteristics other than a antiferrodielectric liquid crystal medium, e.g., a ferroelectric liquid crystal medium or the like.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A matrix liquid crystal device, comprising:
   a liquid crystal displaying device in which n strips of row electrodes and m strips of column electrodes are disposed in a grid facing each other and a liquid crystal medium having a hysteresis characteristic in its light transmittance is contained therebetween to form a plurality of pixels disposed in a matrix formed by said n strips of row electrodes and said m strips of column electrodes;

row driving means for generating scan signals including a selection signal for selecting a display state and a holding voltage for holding a display state of said n strips of row electrodes, said selection signal and said holding voltage being generated at predetermined cycles;

column driving means for generating data signals to said m strips of column electrodes;

control means for controlling said row driving means and said column driving means to generate said scan and data signals to display a field of a picture using said plurality of pixels;

setting means connected to said row driving means, for setting voltages included in said scan signals to said holding voltage independently from said predetermined cycles when a still signal is received externally so that a displayed picture is kept still; and field detecting means for detecting a completion of a field writing for preventing said setting means from setting said scan signals to said holding voltage when the field writing is not finished, and for allowing said setting means to set said scan signals to said holding voltage at a starting point of a next field.

2. The matrix liquid crystal display device according to claim 1, wherein:

said row driving means generates said scan signals responsive to a clock signal from said control means; and said setting means sets said holding voltage by interrupting application of said clock signal from said control means to said row driving means when the still signal is received externally.

3. The matrix liquid crystal display device according to claim 1, wherein:

said row driving means generates an erase voltage for erasing a display, said selection voltage and said holding voltage by receiving timing signals for generating said erase voltage, said selection voltage and said holding voltage from said control means; and said setting means sets said holding voltage by interrupting application of said timing signals for generating said erase voltage and said selection voltage from said control means to said row driving means.

4. The matrix liquid crystal display device according to claim 1, wherein said setting means includes erase and selection voltage setting means for setting an erase voltage for erasing a display and said selection voltage to said holding voltage when the still signal is received externally.

5. The matrix liquid crystal display device according to claim 1, wherein said setting means includes detecting means for detecting a display finish condition when a display of one field of a picture has been finished and setting said holding voltage responsive to said display finish condition when the still signal is received externally.

6. The matrix liquid crystal display device according to claim 5, wherein said detecting means detects that a display of one field of a picture has been finished from a generation of a vertical synchronizing signal which gives a timing for rewriting of said display of said one field.

7. The matrix liquid crystal display device according to claim 1, wherein said liquid crystal medium has a first stable state when a voltage less than a predetermined voltage range is applied, a second stable state when a voltage greater than said predetermined voltage range in a direction of positive polarity is applied, and has said hysteresis characteristic between said first stable state and second stable state, and a voltage applied to said liquid crystal medium when a displayed picture is to be stilled is set to become a voltage between a first threshold voltage which shifts said liquid crystal medium from said first stable state to said second stable state and a second threshold voltage which shifts said liquid crystal medium from said second stable state to said first stable state.

8. The matrix liquid crystal display device according to claim 7, wherein said liquid crystal medium has a hysteresis characteristic in which a difference between said first threshold voltage and said second threshold voltage is greater than a difference between a saturation voltage which shifts said liquid crystal medium from said first stable state to said second stable state and said first threshold voltage.

9. The matrix liquid crystal display device according to claim 7, wherein said holding voltage set when a displayed picture is stilled is set at an intermediate value between said first threshold voltage and said second threshold voltage.

10. The matrix liquid crystal display device according to claim 9, wherein said liquid crystal medium has a hysteresis characteristic in which a difference between said first threshold voltage and said second threshold voltage is greater than a difference between a saturation voltage which shifts said liquid crystal medium from said first stable state to said second stable state and said first threshold voltage.

11. The matrix liquid crystal display device according to claim 1, further comprising data signal fixing means for fixing said data signals to a predetermined voltage when the still signal is received externally.

12. The matrix liquid crystal display device according to claim 1, further comprising means for setting said holding voltage set when a displayed picture is to be stilled to a voltage different from said holding voltage in said scan signal.

13. The matrix liquid crystal display device according to claim 1, further comprising:

temperature detecting means for detecting a temperature of said liquid crystal display device; and means for correcting a holding voltage set when a displayed picture is to be stilled in response to said detected temperature.

14. The matrix liquid crystal display device according to claim 1, wherein said setting means sets said voltages included in said scan signal to said holding voltage for at least two fields.

15. The matrix liquid crystal display device according to claim 1, wherein said field detecting means includes a memory to memorize inputting said still signal, and outputting said memorized still signal to said setting means at the timing when the vertical synchronizing signal is input.

16. The matrix liquid crystal display device according to claim 15, wherein said memory includes a flip-flop.

17. The matrix liquid crystal display device according to claim 1, further comprising:

a field strength detector that monitors a field strength of the broadcasting wave, generates said still signal when said field strength drops less than a present value, and releases the generation of said still signal when said field strength returns above said present value.

18. A matrix liquid crystal display system comprising:

a liquid crystal display device in which n strips of row electrodes and m strips of column electrodes are disposed in a grid facing each other and a liquid crystal medium having a hysteresis characteristic in its light transmittance is contained therebetween, said display device having a plurality of pixels disposed in a matrix formed by said n strips of row electrodes and said m strips of column electrodes;

row driving means for supplying scan signals to said n strips of row electrodes; each scan signal having a selection signal and a holding voltage, said selection signal and said holding voltage being generated at predetermined cycles; and column driving means for supplying data signals to said m strips of column electrodes;

column driving means for supplying data signals to said m strips of column electrodes;

wherein said liquid crystal display device displays a field of a picture using said plurality of pixels when said scan and data signals are supplied;

said liquid crystal medium has a hysteresis characteristic in its light transmittance;

said liquid crystal display device further comprises setting means for setting all voltages between said n strips of row electrodes and said m strips of column electrodes at a setting voltage for holding said liquid crystal medium independently from said predetermined cycles when a hold signal is received externally so that a displayed picture is kept still using said hysteresis characteristic and field detecting means for detecting a completion of a field writing, and for allowing said setting means to set said scan signals to said setting voltage, only when the field writing is finished, at a starting point of a next field.

19. A matrix liquid crystal device, comprising:

a liquid crystal displaying device in which n strips of row electrodes and m strips of column electrodes are disposed in a grid facing each other and a liquid crystal medium having a hysteresis characteristic in its light transmittance is contained therebetween to form a plurality of pixels disposed in a matrix formed by said n strips of row electrodes and said m strips of column electrodes;

row driving means for generating scan signals including a selection signal for selecting a display state and a holding voltage for holding a display state of said n strips of row electrodes, said selection signal and said holding voltage being generated at predetermined cycles;

column driving means for generating data signals to said m strips of column electrodes;

control means for controlling said row driving means and said column driving means to generate said scan and data signals to display a field of a picture using said plurality of pixels;

setting means connected to said row driving means, for setting voltages included in said scan signal to said holding voltage independently from said predetermined cycles when a still signal is received externally so that a displayed picture is kept still; and a field strength detector that monitors a field strength of the broadcasting wave, generates said still signal when said field strength drops less than a present value, and releases the generation of said still signal when said field strength returns above said present value.

* * * * *